(12) United States Patent
Flodin et al.

(10) Patent No.: US 8,887,878 B2
(45) Date of Patent: Nov. 18, 2014

(54) VARIABLE POSITION ANCHOR ASSEMBLY FOR ADJUSTING BRAKE SHOES IN A DRUM BRAKE

(75) Inventors: Troy A. Flodin, Caledonia, MI (US); Daniel E. Banks, Climax, MI (US); Michael A. Chamberlin, Richland, MI (US); James R. Clark, Plainwell, MI (US); Thomas L. Runels, Battle Creek, MI (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 845 days.

(21) Appl. No.: 12/850,236

(22) Filed: Aug. 4, 2010

(65) Prior Publication Data
US 2012/0031716 A1    Feb. 9, 2012

(51) Int. Cl.
| | |
|---|---|
| *F16D 51/00* | (2006.01) |
| *F16D 51/18* | (2006.01) |
| *F16D 65/56* | (2006.01) |
| *F16D 65/66* | (2006.01) |
| *F16D 55/14* | (2006.01) |
| *F16D 65/38* | (2006.01) |
| *F16D 121/24* | (2012.01) |
| *F16D 123/00* | (2012.01) |
| *F16D 125/20* | (2012.01) |
| *F16D 125/22* | (2012.01) |
| *F16D 125/40* | (2012.01) |

(52) U.S. Cl.
CPC .............. *F16D 51/18* (2013.01); *F16D 65/565* (2013.01); *F16D 65/66* (2013.01); *F16D 2065/386* (2013.01); *F16D 2121/24* (2013.01); *F16D 2123/00* (2013.01); *F16D 2125/20* (2013.01); *F16D 2125/22* (2013.01); *F16D 2125/40* (2013.01)

USPC .................. 188/79.63; 188/196 V; 188/73.1; 188/339

(58) Field of Classification Search
USPC ........... 188/79.63, 196 V, 329, 330, 332, 338, 188/339, 72.7, 73.1
See application file for complete search history.

(56) References Cited

U.S. PATENT DOCUMENTS

| | | | | |
|---|---|---|---|---|
| 1,550,398 A | * | 8/1925 | Stoner ........................... | 188/329 |
| 1,848,258 A | * | 3/1932 | McConkey ................ | 188/79.61 |

(Continued)

FOREIGN PATENT DOCUMENTS

| | | |
|---|---|---|
| DE | 10003207 A1 | 8/2001 |
| DE | 102005025296 A1 | 12/2006 |

(Continued)

OTHER PUBLICATIONS

International Search Report issued in corresponding international patent application PCT/US2011/046258 (Oct. 26, 2011).

(Continued)

*Primary Examiner* — Melody Burch
(74) *Attorney, Agent, or Firm* — Reising Ethington P.C.

(57) ABSTRACT

An anchor assembly is provided that permits adjustment of the brake shoes in a drum brake to account for wear. The assembly includes first and second adjuster shafts each having a plurality of threads and first and second pilot connectors. The pilot connectors each have a plurality of threads in engagement with the threads of a corresponding adjuster shaft. The pilot connectors each engage one end of a corresponding brake shoe. Rotation of each adjuster shaft causes longitudinal movement of a corresponding pilot connector in engagement with a corresponding brake shoe along an axis to adjust a position of the brake shoe.

19 Claims, 2 Drawing Sheets

(56) References Cited

U.S. PATENT DOCUMENTS

| | | | |
|---|---|---|---|
| 2,030,771 A * | 2/1936 | Still | 196/104 |
| 2,389,311 A * | 11/1945 | Hirschman et al. | 188/325 |
| 3,532,193 A * | 10/1970 | Kaiser | 188/79.63 |
| 3,805,926 A * | 4/1974 | Clay et al. | 188/79.63 |
| 4,380,277 A * | 4/1983 | Ingram et al. | 188/329 |
| 4,537,293 A * | 8/1985 | Osborne | 188/196 BA |
| 4,860,859 A | 8/1989 | Yamatoh et al. | |
| 5,524,735 A * | 6/1996 | Gee | 188/330 |
| 5,769,189 A | 6/1998 | Heibel et al. | |
| 5,855,255 A | 1/1999 | Bock et al. | |
| 5,913,390 A | 6/1999 | Hostetler | |
| RE36,312 E * | 9/1999 | Muzzy | 188/79.56 |
| 6,408,994 B1 | 6/2002 | Maehara | |
| 7,086,504 B2 | 8/2006 | Baumgartner et al. | |
| 7,182,184 B2 | 2/2007 | Baumgartner | |
| 7,413,061 B2 | 8/2008 | Wagner et al. | |

FOREIGN PATENT DOCUMENTS

| | | |
|---|---|---|
| DE | 102006009089 A1 | 8/2007 |
| GB | 469911 A | 8/1937 |
| GB | 620994 A | 4/1949 |

OTHER PUBLICATIONS

Written Opinion issued in corresponding international patent application PCT/US2011/046258 (Oct. 26, 2011).

Machine Translation of DE 10003207 obtained from European Patent Office (Nov. 16, 2011).

Machine Translation of DE 102005025296 obtained from European Patent Office (Nov. 16, 2011).

Machine Translation of DE 102006009089 obtained from European Patent Office (Nov. 16, 2011).

\* cited by examiner

VARIABLE POSITION ANCHOR ASSEMBLY FOR ADJUSTING BRAKE SHOES IN A DRUM BRAKE

BACKGROUND OF THE INVENTION

1. Field of the Invention

This invention relates to drum brakes and, in particular, to a variable position anchor assembly that permits adjustment of the position of brake shoes relative to the brake drum to account for wear.

2. Discussion of Related Art

A conventional drum brake includes a brake drum that rotates with a wheel or wheels proximate to one end of an axle. The brake drum defines a radially inner braking surface. A brake spider is disposed about the axle and supports an anchor pin that extends from the spider. A pair of brake shoes are pivotally mounted at one end on the anchor. The opposite end of each brake shoe is engaged by an actuator such as a cam or hydraulic piston or wedge to move the brake shoes between positions of engagement and disengagement with the braking surface of the brake drum.

Over time the clearance between the brake shoes and the braking surface of the drum increases with wear of the brake shoe linings and drum. The clearance may also increase due to expansion of the drum due to heating from the braking action. The increase in clearance leads to a degradation in braking performance and ultimately requires costly and time consuming maintenance operations to replace the linings. Brakes commonly include mechanically activated automatic slack adjusters to reposition the brake shoes periodically and restore the clearance as wear occurs. Conventional slack adjusters, however, have several drawbacks. First, conventional slack adjusters are located at one end of a long camshaft controlling the brake actuator and therefore are somewhat removed from the actual surfaces that are being adjusted (i.e., the surfaces of the brake lining and the drum). Flexure and sometimes poor fit between the various components located between the slack adjuster and the lining/drum surfaces can result in non-optimum adjustment (either under adjustment or over adjustment). Second, conventional slack adjusters are typically "one way" in that they are only designed to reduce the clearance between the brake linings and drum and do not "back up" if the lining swells or other factors cause too tight of a fit between the lining and drum surfaces. For example, while a vehicle descends along a long grade, the brakes heat up causing expansion of the drum. Conventional adjusters compensate for the expanding drum. When the vehicle reaches the bottom of the grade and the brakes cool, however, the drum—and the gap between the drum and brake linings—shrinks which can result in a gap that is smaller than desired and can even result in undesirable contact between the braking linings and drum (a dragging brake).

The inventors herein have recognized a need for an anchor assembly for a brake that will minimize and/or eliminate one or more of the above-identified deficiencies.

SUMMARY OF THE INVENTION

The present invention provides a variable position anchor assembly for adjusting the position of first and second brake shoes in a drum brake.

An anchor assembly in accordance with one embodiment of the present invention includes first and second adjuster shafts each having a plurality of threads and first and second pilot connectors. The first pilot connector is configured to engage a first end of the first brake shoe. The first pilot connector has a plurality of threads in engagement with the plurality of threads of the first adjuster shaft. The second pilot connector is configured to engage a first end of the second brake shoe. The second pilot connector has a plurality of threads in engagement with the plurality of threads of the second adjuster shaft. Rotation of the first adjuster shaft causes longitudinal movement of the first pilot connector along a first axis to adjust a position of the first brake shoe and rotation of the second adjuster shaft causes longitudinal movement of the second pilot connector along a second axis to adjust a position of the second brake shoe.

An anchor assembly in accordance with the present invention provides a means for adjusting the position of brake shoes to compensate for wear in brake linings. The inventive assembly represents an improvement over conventional slack adjustment mechanisms. The inventive assembly permits finer control of adjustments than in conventional slack adjusters. The inventive assembly also permits "two way" adjustment of the position of the brake shoes such that the brake shoes can be retracted from the braking surface if the fit between the brake shoes and braking surface becomes too tight for any reason. In accordance with one embodiment of the invention, an electric motor is used to cause rotation of the first and second adjuster shafts. The use of the motor and appropriate logic control allows accurate control of the gap between the brake shoes and braking surface of the drum and "two way" adjustment of the position of the brake shoes. Because the inventive adjustment assembly is located at the anchor end of the brake—opposite the location of the brake actuator—the inventive assembly also has additional space in which to fit and operate. As a result, the assembly has a greater range of adjustment and permits the brake shoes to be moved in a direction outward toward the braking surface, but also vertically upward toward the brake actuator thereby facilitating the use of thicker brake linings. Thicker brake linings result in longer life of the brake thereby reducing operating costs for vehicle fleets. The inventive assembly also allows slack adjustment components to be integrated with the brake spider for ease of manufacture and assembly.

These and other advantages of this invention will become apparent to one skilled in the art from the following detailed description and the accompanying drawings illustrating features of this invention by way of example.

DETAILED DESCRIPTION OF EMBODIMENTS OF THE INVENTION

Figure 1:
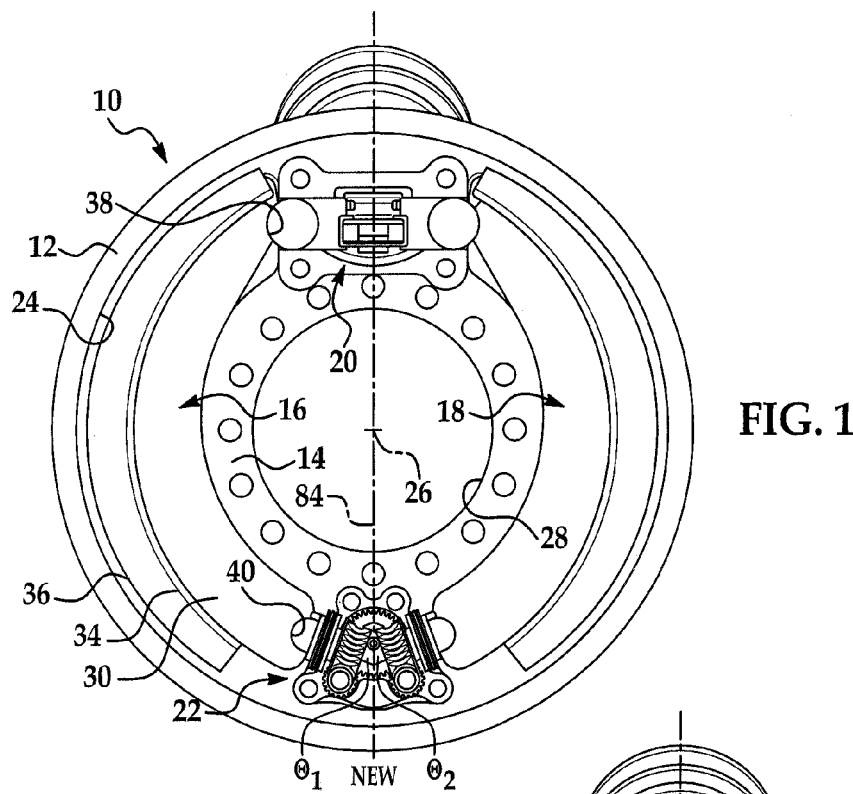
FIGS. 1 and 2 are plan views of a brake including an anchor assembly in accordance with one embodiment of the present invention illustrating conditions in which the brake linings are new and worn.
Figure 2:
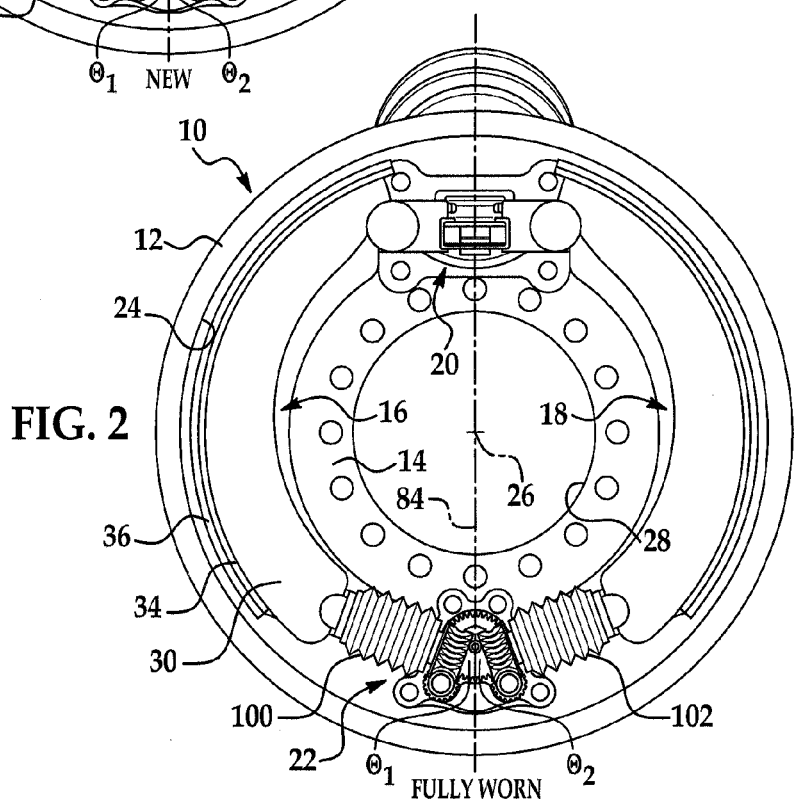

Referring now to the drawings wherein like reference numerals are used to identify identical components in the various views, FIGS. 1-2 illustrate a brake 10 in accordance with one embodiment of the present invention. Brake 10 is particularly adapted for use in heavy trucks. It should be understood, however, that brake 10 may be used on a wide variety of vehicles and in non-vehicular applications. Brake 10 may include a brake drum 12, a brake spider 14, brake shoes 16, 18, an actuator 20, and an anchor assembly 22 in accordance with the present invention.

Brake drum 12 provides a braking surface 24 and is conventional in the art. Drum 12 may be made from conventional metals and metal alloys such as steel or cast iron. Drum 12 is annular and rotates with the vehicle wheel or wheels at one end of an axle about a central axis 26 extending through the axle (and into and out of drawings in FIGS. 1-2).

Brake spider 14 is provided to mount the various components of brake 10. Spider 14 defines a central aperture 28 through which the vehicle axle may extend. Spider 14 also supports actuator 20 and anchor assembly 22 on diametrically opposite sides of the axle.

Brake shoes 16, 18 are provided for selective engagement with braking surface 24 of drum 12. Brake shoes 16, 18 may each include one or more webs, such as spaced webs 30, 32 (best shown in FIG. 3), a brake table 34, and one or more brake linings 36.

Webs 30, 32 are provide to support brake table 34 and may extend generally parallel to one another. Webs 30, 32 are semicircular in shape and may define semicircular recesses 38, 40 at either end. Recess 38 is configured to receive a portion of actuator 20. Recess 40 is configured to receive a portion of anchor assembly 22 as discussed in greater detail hereinbelow. Webs 30, 32 may also provide a connection point for retainer springs (not shown) used to retain brake shoes 16, 18 in engagement with anchor assembly 20 and return springs (not shown) used to bias brake shoes 16, 18 to a position of disengagement from braking surface 24.

Brake table 34 is provided to support brake linings 36 and is conventional in the art. Table 34 may be affixed to webs 30, 32 through welding, adhesives, or other fasteners. Table 34 is semicircular in cross-section and is substantially perpendicular to webs 30, 32.

Linings 36 are provided for frictional engagement with braking surface 24 of drum 12. Linings 36 may be made from conventional friction materials. In accordance with the present invention, linings 36 that are thicker than conventional brake linings may be used to limit maintenance and vehicle down time. In the illustrated embodiment, each brake shoe 16, 18 includes a single brake lining 36. It should be understood, however, that the number, size and shape of linings 36 may vary.

Actuator 20 is provided to cause movement of brake shoes 16, 18 between positions of engagement with and disengagement from braking surface 24 of drum 22. In the illustrated embodiment, actuator 20 comprises a conventional fluid actuator in which pneumatic or hydraulic fluid urges pistons to move in a direction causing movement of brake shoes 16, 18 toward and away from braking surface 24. It should be understood, however, that actuator 20 may assume a variety of forms including a conventional double-lobed cam or S-cam or a wedge type mechanism.

Figure 3:
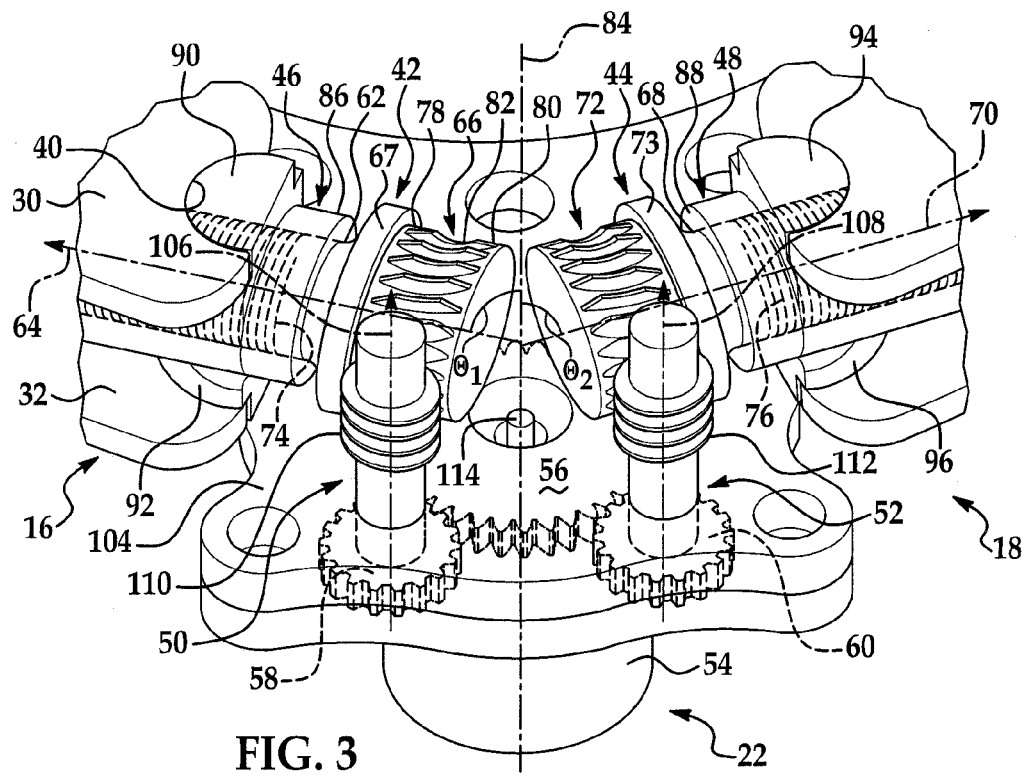
FIG. 3 is an enlarged perspective view of the anchor assembly of FIGS. 1-2.

Anchor assembly 22 provides a pivot mount for brake shoes 16, 18 to allow pivoting motion of brake shoes 16, 18 in response to motion induced by actuator 20. In accordance with the present invention assembly 22 also provides a means for adjusting the position of brake shoes 16, 18 in order to compensate for wear in brake linings 36. Referring to FIG. 3, assembly 22 may include adjuster shafts 42, 44, pilot connectors 46, 48, worm shafts 50, 52, motor 54, and spur gears 56, 58, 60.

Adjuster shafts 42, 44 work with pilot connectors 46, 48 to adjust the position of brake shoes 16, 18. Adjuster shafts 42, 44 and pilot connects 46, 48, respectively, have a male/female relationship such that one member in each shaft-connector pair moves inward and outward within the other member in the pair. In the illustrated embodiment, adjuster shafts 42, 44 form the male members of each pair and connectors 46, 48, form the female members of each pair. It should be understood, however, that this relationship could be reversed. Adjuster shaft 42 includes a shaft 62 disposed about a central axis 64 and a head 66 and shoulder 67 at one axial end. Likewise, adjuster shaft 44 includes a shaft 68 disposed about a central axis 70 and a head 72 and shoulder 73 at one axial end. Shafts 62, 68 each include a plurality of threads 74, 76, respectively, extending along at least a portion of the shafts 62, 68. Heads 66, 72 each define a gear and, in particular, may define a throated worm gear. In the illustrated embodiment, each head 66, 72 defines lands 78, 80 at either axial end of the head 66, 72 that are designed to carry loads imparted to shafts 42, 44 by worm shafts 50, 52 and a plurality of grooves 82 extending between lands 78, 80. Shoulders 67, 73 are designed to carry loads imparted to shafts 42, 44 from braking. Shafts 42, 44, may be made from metal alloys and may be forged and rolled or machined with grooves 82 formed by hobbing or machining and shafts 42, 44, and may be heat treated. Shafts 42, 44, may also be made from powdered metals or plastics.

In accordance with one aspect of the present invention, the central axes 64, 70 of shafts 62, 68 of adjuster shafts 42, 44 intersect a plane 84 extending through central axis 26 at an acute angle $\theta_1$, $\theta_2$ (see FIGS. 1-2). In one embodiment of the invention, each angle $\theta_1$, $\theta_2$ is sixty (60) degrees relative to plane 84 such that adjuster shafts 42, 44 are angled relative to each other at one hundred and twenty (120) degrees. Although angles $\theta_1$, $\theta_2$ are identical in the illustrated embodiment, angles $\theta_1$, $\theta_2$ may differ from one another if it is desired to load the brake differently. In many conventional slack adjusters, brake shoes 16, 18, are moved in a direction perpendicular to plane 84. Angling shafts 42, 44, relative to plane 84 provides several advantages. First, shafts 42, 44, are able to more directly react braking loads transmitted through brake shoes 16, 18. Second, as illustrated in FIGS. 1 and 2, shafts 42, 44, urge brake shoes 16, 18, vertically upward (in the direction towards actuator 20) in addition to forcing brake shoes 16, 18 radially outward toward braking surface 24. This motion increases the actuating force to compensate for the loss of lever angle and enables thicker brake linings 36 to be used on brake shoes 16, 18 thereby decreasing maintenance of brake 10 and vehicle down time with resulting cost savings.

As noted hereinabove, connectors 46, 48 represent the female member of the shaft-connector pair in the illustrated embodiment. Accordingly, connectors 46, 48 include tubular bodies 86, 88, respectively. Bodies 86, 88 are substantially circular in the illustrated embodiment, but it should be understood that the shape of bodies 86, 88 could vary. Body 86 includes a plurality of threads disposed on a radially inner surface configured to engage threads 74 of shaft 42. Similarly, body 88 includes a plurality of threads disposed on a radially inner surface configured to engage threads 76 of shaft 44. Each of bodies 86, 88, further includes a pair of lands 90, 92 and 94, 96, respectively, extending from diametrically opposite sides of bodies 86,88. Each of lands 90, 92, 94, 96 is configured to be received within a recess 40 in a corresponding web 30, 32. Each land 90, 92, 94, 96 may be semicircular in cross-section to permit a degree of relative pivotal rotation between lands 90, 92, 94, 96 and webs 30, 32. Referring to FIGS. 1-2, expandable boot seals 100, 102 may be disposed about bodies 86, 88 to prevent contamination of the adjuster shaft-connector interface. Although not illustrated in FIG. 3, adjuster shafts 42, 44, worm shafts 50, 52 and gears 56, 58, 60 may be partially or fully enclosed in a block or housing having recesses and bores configured to receive shafts 42, 44

50, 52 and gears 56, 58, 60 and provide structural support for these components. In combination with this block or housing, boot seals 100, 102 may also serve to prevent contamination of the interfaces among shafts 42, 44 and worm shafts 50, 52 and among worm shafts 50, 52 and gears 56, 58, 60.

Worm shafts 50, 52, transfer a torque from motor 54 and gears 56, 58, 60 to adjuster shafts 42, 44. Worm shafts 50, 52 may be made from metal alloys and formed by rolling or machining and may be heat treated. Worm shafts 50, 52, may also be made from powdered metals or plastics. Worm shafts 50, 52 may be supported at one end by a mounting bracket 104 that is fastened to or integral with spider 14. Worm shafts 50, 52, include generally circular shafts that are rotatable about axes 106, 108. Axes 106, 108, may be parallel to plane 84 and, therefore, axes 64, 70 of adjuster shafts 42, 44 may intersect planes that extend through axes 106, 108 and are parallel to plane 84, at the same acute angles $\theta_1, \theta_2$. A worm 110, 112, is formed on each shaft 50, 52 and is in mesh with the grooves 82 in a corresponding anchor adjust shaft 42, 44. The worms 110, 112, are threaded in opposite directions (i.e., one is left-handed and one is right-handed) although it should be understood that worms 110, 112 could be threaded in the same direction with heads 66, 72 of shafts 42, 44 threaded in opposite directions. The use of worm shafts 50, 52, in combination with worm gears in adjuster shafts 42, 44, provides a more robust method of transferring torque into brake shoes 16, 18 than conventional slack adjusters, provides more precise adjustment of position and enables the use of a relatively small motor 54 because of the gear ratio. Although the illustrated embodiment uses worm shafts 50, 52, and worm gears to transfer torque, it is also possible to use bevel or helical gears.

Motor 54 provide a means for rotating worm shafts 50, 52, and, consequently, adjuster shafts 42, 44 in both a clockwise and counterclockwise direction. Motor 54 may comprise a conventional electric motor (e.g. a servo motor) which may be controlled by an electronic control unit (not shown) responsive to signals from sensors indicative of the clearance between brake shoes 16, 18 and braking surface 24. In particular, a temperature sensor may be used to detect high temperature operation (such as during extended braking on a steep grade) that results in expansion of drum 12 and increased clearance between brake shoes 36 and braking surface 24 of drum 12. Motor 54 may respond by rotating shafts 42, 44 in one direction to adjust the position of brake shoes 16, 18 and reduce the clearance. When the brake cools and drum 12 contracts, motor may respond to the change in temperature measured by the sensor by rotating shafts 42, 44 in the opposite rotational direction to adjust the position of brake shoes 16, 18 again and back linings 36 away from braking surface 24. Motor 54 may be mounted on and disposed on one side of bracket 104 opposite worm shafts 50, 52 and gears 56, 58, 60. A shaft 114 extends from motor 54 through bracket 104 and gear 56 is mounted on shaft 114. Gears 58, 60, are disposed proximate one longitudinal end of worm shafts 50, 52, respectively and are in mesh with gear 56. Although the illustrated embodiment uses three gears to transfer motion from motor 54 to worm shafts 50, 52, it should be understood that the number of gears and the overall arrangement of gears could vary.

Figure 4:
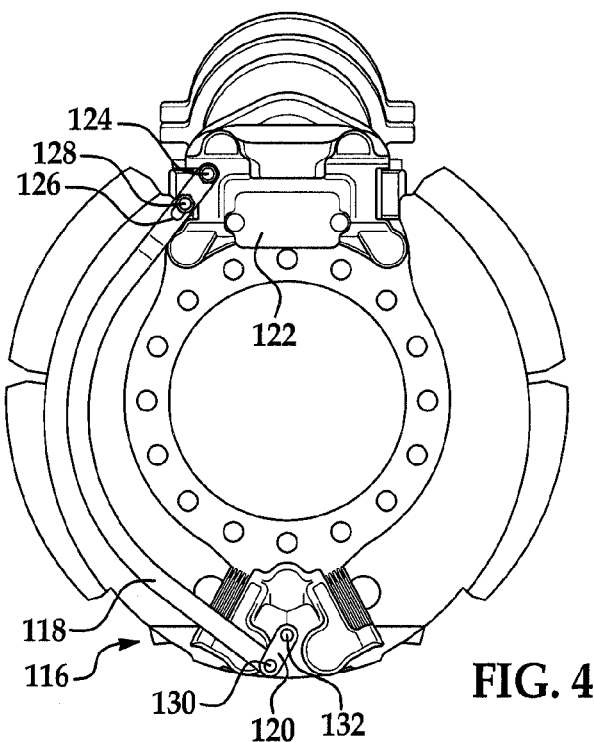
FIG. 4 is a plan view of a brake including an anchor assembly in accordance with another embodiment of the present invention.

Referring to FIG. 4, in an alternate embodiment of the invention, a mechanical linkage 116 provides a means for rotating worm shafts 50, 52 and adjuster shafts 42, 44. In the illustrated embodiment, linkage 116 includes a link 118 and a shackle 120. Link 118 is fastened at one end to a housing 122 of a brake actuator by a fastener 124. Link 118 defines a slot 126 proximate the same end configured to receive a fastener 128 coupled to a piston of the actuator. The opposite end of link 118 is coupled to one end of shackle 120 by a fastener 130. Movement of the piston causes fastener 128 to travel along slot 126 and causes link 118 to rotate about fastener 124. Rotation about fastener 124 causes corresponding rotation in shackle 120 Shackle 120 may be connected to a shaft 132 which may be take the place of motor shaft 114. Rotation of shackle 120 therefore causes corresponding rotation in shaft 132 and, ultimately, adjusters shafts 42, 44. Although not shown in the illustrated embodiment, a backstopping or one-way clutch may also be interposed between motor 54 or linkage 116 and worm shafts 50, 52 to prevent reverse rotation of worm shafts 50, 52, and adjuster shafts 42, 44.

An anchor assembly in accordance with the present invention helps improve the life of drum braking systems by adjusting the position of the brake shoes to compensate for wear. The inventive assembly represents an improvement over conventional slack adjusters and other means for adjusting the position of brake shoes because the assembly permits more precise control of adjustments than in conventional slack adjusters. The inventive assembly also permits "two way" adjustment of the position of the brake shoes such that the brake shoes can be retracted from the braking surface if the fit between the brake shoes and braking surface becomes too tight for any reason. Because the inventive adjustment assembly is located at the anchor end of the brake—opposite the location of the brake actuator—the inventive assembly also has additional space in which to fit and operate. As a result, the assembly has a greater range of adjustment and permits the brake shoes to be moved in a direction outward toward the braking surface, but also vertically upward toward the brake actuator thereby facilitating the use of thicker brake linings and reducing operating costs for vehicle fleets. The inventive assembly also allows slack adjustment components to be integrated with the brake spider for ease of manufacture and assembly.

While the invention has been shown and described with reference to one or more particular embodiments thereof, it will be understood by those of skill in the art that various changes and modifications can be made without departing from the spirit and scope of the invention.

We claim:

1. An anchor assembly for adjusting the position of first and second brake shoes in a drum brake, comprising:
    first and second adjuster shafts each having a plurality of threads;
    a first pilot connector configured to engage a first end of said first brake shoe, said first pilot connector having a plurality of threads in engagement with said plurality of threads of said first adjuster shaft; and,
    a second pilot connector configured to engage a first end of said second brake shoe, said second pilot connector having a plurality of threads in engagement with said plurality of threads of said second adjuster shaft;
    wherein rotation of said first adjuster shaft causes longitudinal movement of said first pilot connector along a first axis to adjust a position of said first brake shoe and rotation of said second adjuster shaft causes longitudinal movement of said second pilot connector along a second axis to adjust a position of said second brake shoe
    wherein each of said first and second adjuster shafts includes a head at one end, said head defining a gear and wherein said gears of said first and second adjuster shafts comprise worm gears
    further comprising first and second worm shafts in mesh with said gears of said first and second adjuster shafts wherein said first axis intersects a plane coincident with a rotational axis of said first worm shaft at an acute angle and said second axis intersects a plane coincident with a rotational axis of said second worm shaft at an acute angle.

2. The anchor assembly of claim 1, further comprising means for rotating said first and second adjuster shafts.

3. The anchor assembly of claim 2 wherein said rotating means comprises an electric motor.

4. The anchor assembly of claim 2 wherein said rotating means is configured to rotate said first and second adjuster shafts in both a clockwise direction and a counterclockwise direction.

5. The anchor assembly of claim 1 wherein said first and second pilot connectors are tubular and configured to receive a corresponding one of said first and second adjuster shafts therein.

6. The anchor assembly of claim 1 wherein each of said first and second pilot connectors defines a first land configured to engage a first web of a corresponding one of said first and second brake shoes.

7. The anchor assembly of claim 6 wherein said first pilot connector defines a second land diametrically opposite said first land of said first pilot connector relative to said first axis and configured to engage a second web of said first brake shoe and said second pilot connector defines a second land diametrically opposite said first land of said second pilot connector relative to said second axis and configured to engage a second web of said second brake shoe.

8. A brake, comprising:
first and second brake shoes;
an actuator located at a first end of said first brake shoe and a first end of said second brake shoe and configured to move said first said first and second brake shoes between positions of engagement and disengagement with a braking surface;
first and second adjuster shafts each having a plurality of threads;
a first pilot connector configured to engage a second end of said first brake shoe, said first pilot connector having a plurality of threads in engagement with said plurality of threads of said first adjuster shaft; and,
a second pilot connector configured to engage a second end of said second brake shoe, said second pilot connector having a plurality of threads in engagement with said plurality of threads of said second adjuster shaft;
wherein rotation of said first adjuster shaft causes longitudinal movement of said first pilot connector along a first axis to adjust a position of said first brake shoe and rotation of said second adjuster shaft causes longitudinal movement of said second pilot connector along a second axis to adjust a position of said second brake shoe
wherein said first axis is configured to intersect a plane coincident with a center axis of the brake at a first acute angle and said second axis is configured to intersect the plane coincident with the center axis of the brake at a second acute angle.

9. The brake of claim 8, further comprising means for rotating said first and second adjuster shafts.

10. The brake of claim 9 wherein said rotating means comprises an electric motor.

11. The brake of claim 9 wherein said rotating means is configured to rotate said first and second adjuster shafts in both a clockwise direction and a counterclockwise direction.

12. The brake of claim 8 wherein each of said first and second adjuster shafts includes a head at one end, said head defining a gear.

13. The brake of claim 12 wherein said gears of said first and second adjuster shafts comprise worm gears.

14. The brake of claim 13, further comprising first and second worms in mesh with said gears of said first and second adjuster shafts.

15. The brake of claim 13, further comprising first and second worm shafts in mesh with said gears of said first and second adjuster shafts.

16. The brake of claim 15 wherein said first axis intersects a plane coincident with a rotational axis of said first worm shaft at a third acute angle and said second axis intersects a plane coincident with a rotational axis of said second worm shaft at a fourth acute angle.

17. The brake of claim 8 wherein said first and second pilot connectors are tubular and configured to receive a corresponding one of said first and second adjuster shafts therein.

18. The brake of claim 8 wherein each of said first and second pilot connectors defines a first land configured to engage a first web of a corresponding one of said first and second brake shoes.

19. The brake of claim 18 wherein said first pilot connector defines a second land diametrically opposite said first land of said first pilot connector relative to said first axis and configured to engage a second web of said first brake shoe and said second pilot connector defines a second land diametrically opposite said first land of said second pilot connector relative to said second axis and configured to engage a second web of said second brake shoe.

\* \* \* \* \*